US009728974B2

(12) United States Patent
Rudolph et al.

(10) Patent No.: US 9,728,974 B2
(45) Date of Patent: Aug. 8, 2017

(54) RENEWABLE ENERGY SITE REACTIVE POWER CONTROL

(71) Applicant: TMEIC Corporation, Roanoke, VA (US)

(72) Inventors: Benjamin D. Rudolph, Roanoke, VA (US); Paul S. Bixel, Salem, VA (US)

(73) Assignee: TMEIC Corporation, Roanoke, VA (US)

( * ) Notice: Subject to any disclaimer, the term of this patent is extended or adjusted under 35 U.S.C. 154(b) by 874 days.

(21) Appl. No.: 14/050,928

(22) Filed: Oct. 10, 2013

(65) Prior Publication Data

US 2015/0102674 A1    Apr. 16, 2015

(51) Int. Cl.
*H02J 1/10* (2006.01)
*H02J 3/38* (2006.01)
(Continued)

(52) U.S. Cl.
CPC ...... *H02J 3/50* (2013.01); *H02J 3/18* (2013.01); *H02J 3/381* (2013.01); *H02J 3/16* (2013.01);
(Continued)

(58) Field of Classification Search
CPC ...... H02J 3/50; H02J 3/18; H02J 3/381; H02J 3/16; H02J 3/1842; Y02B 70/126;
(Continued)

(56) References Cited

U.S. PATENT DOCUMENTS 4,079,305 A * 3/1978 Peterson .................. H03K 3/57
307/104
4,994,981 A    2/1991 Walker et al.
(Continued)

FOREIGN PATENT DOCUMENTS

EP    2164147 A2    3/2010
SE    1200204       4/2012
(Continued)

OTHER PUBLICATIONS

Co-Pending Application No. DE 10 2014 114 620.4 filed Oct. 8, 2014.
(Continued)

*Primary Examiner* — Richard Tan
(74) *Attorney, Agent, or Firm* — New River Valley IP Law, PC; Michele L. Mayberry; Timothy D. Nolan

(57) ABSTRACT

Methods, systems, controller devices, and computer program products for reactive power control at a renewable energy site are provided. Embodiments address dynamic performance problems associated with control loop delay and the changing modes of operation for meeting utility voltage and reactive power constraints. Provided is a method for reactive power control involving: (a) determining a site-wide reactive power command comprised by a sum of a reactive power feedforward or compensation term and an integrator term; and (b) distributing the site-wide reactive power command among inverters. Embodiments can include a reactive power control term based on the sum of a single integrator and reactive power compensation term, an integrator anti-windup mechanism based on the status of individual inverters, a means for decreasing detrimental effects of loop delay during reactive power reference changes, and/or a means of implementing voltage and power factor limits with smooth transfer between reactive power operating regions.

23 Claims, 9 Drawing Sheets

(51) Int. Cl.
*H02J 3/50* (2006.01)
*H02M 1/42* (2007.01)
*H02J 3/16* (2006.01)
*H02J 3/18* (2006.01)

(52) U.S. Cl.
CPC .......... *H02J 3/1842* (2013.01); *H02M 1/4233* (2013.01); *Y02B 70/126* (2013.01); *Y02E 40/22* (2013.01); *Y02E 40/34* (2013.01); *Y10T 307/549* (2015.04)

(58) Field of Classification Search
CPC ...... Y02E 40/34; Y02E 40/22; H02M 1/4233; Y10T 307/549
USPC .......................................................... 307/52
See application file for complete search history.

(56) References Cited

U.S. PATENT DOCUMENTS

| | | |
|---|---|---|
| 5,923,158 A | 7/1999 | Kurokami et al. |
| 6,512,966 B2 | 1/2003 | Lof et al. |
| 7,315,462 B2 | 1/2008 | Melhem |
| 7,505,833 B2 | 3/2009 | Delmerico et al. |
| 7,843,085 B2 | 11/2010 | Ledenev et al. |
| 7,890,217 B2 | 2/2011 | Cardinal et al. |
| 7,899,035 B2 | 3/2011 | Eklund et al. |
| 7,913,181 B2 | 3/2011 | Kumar et al. |
| 7,923,862 B2 | 4/2011 | Cardinal et al. |
| 7,925,552 B2 | 4/2011 | Tarbell et al. |
| 7,952,897 B2 | 5/2011 | Nocentini et al. |
| 7,962,247 B2 | 6/2011 | Beekhuis |
| 7,966,100 B2 | 6/2011 | Beekhuis |
| 7,979,167 B2 | 7/2011 | Delmerico et al. |
| 8,044,533 B2 | 10/2011 | Schill |
| 8,053,930 B2 | 11/2011 | Cramer et al. |
| 8,076,625 B2 | 12/2011 | Mcdonald |
| 8,138,631 B2 | 3/2012 | Allen et al. |
| 8,184,460 B2 | 5/2012 | O'Brien et al. |
| 8,193,661 B2 | 6/2012 | Jagota et al. |
| 8,222,765 B2 | 7/2012 | Collins et al. |
| 8,242,634 B2 | 8/2012 | Schatz et al. |
| 8,260,469 B2 | 9/2012 | Gregory et al. |
| 8,289,183 B1 | 10/2012 | Foss |
| 8,299,412 B2 | 10/2012 | Pan |
| 8,338,989 B2 | 12/2012 | Thompson |
| 8,362,739 B2 | 1/2013 | Perot et al. |
| 8,391,032 B2 | 3/2013 | Garrity et al. |
| 8,467,208 B1 | 6/2013 | Johns |
| 9,270,164 B2 | 2/2016 | Bixel et al. |
| 2003/0006613 A1 | 1/2003 | Lof et al. |
| 2008/0272758 A1* | 11/2008 | Melanson ........... H02M 1/4225 323/283 |
| 2009/0132302 A1 | 5/2009 | Beekhuis |
| 2010/0057267 A1 | 3/2010 | Liu |
| 2010/0114397 A1* | 5/2010 | Cardinal ............ H02J 3/383 700/297 |
| 2010/0127737 A1* | 5/2010 | Jungreis ............. H02M 1/12 327/122 |
| 2010/0134076 A1 | 6/2010 | Cardinal et al. |
| 2010/0145532 A1 | 6/2010 | Gregory et al. |
| 2010/0145533 A1 | 6/2010 | Cardinal |
| 2010/0253151 A1 | 10/2010 | Gerhardinger |
| 2011/0044083 A1 | 2/2011 | Thompson |
| 2011/0060474 A1 | 3/2011 | Schmiegel et al. |
| 2011/0163606 A1 | 7/2011 | Kumar et al. |
| 2011/0169344 A1 | 7/2011 | Suekane et al. |
| 2011/0231159 A1 | 9/2011 | Allert et al. |
| 2011/0273129 A1 | 11/2011 | Coe et al. |
| 2012/0004780 A1 | 1/2012 | Miller et al. |
| 2012/0039101 A1 | 2/2012 | Falk et al. |
| 2012/0049636 A1 | 3/2012 | Galbraith et al. |
| 2012/0084027 A1 | 4/2012 | Caine |
| 2012/0098346 A1 | 4/2012 | Garrity et al. |
| 2012/0205974 A1 | 8/2012 | Mccaslin et al. |
| 2012/0205981 A1 | 8/2012 | Varma et al. |
| 2012/0217807 A1 | 8/2012 | Galler et al. |
| 2012/0235498 A1 | 9/2012 | Johnson |
| 2012/0243416 A1 | 9/2012 | Hussain et al. |
| 2012/0262960 A1 | 10/2012 | Giraut Ruso et al. |
| 2012/0326511 A1 | 12/2012 | Johnson |
| 2013/0013257 A1 | 1/2013 | Yamakawa et al. |
| 2013/0250635 A1 | 9/2013 | Sivakumar et al. |
| 2014/0376289 A1 | 12/2014 | Bixel et al. |
| 2015/0134251 A1 | 5/2015 | Bixel |

FOREIGN PATENT DOCUMENTS

| | | |
|---|---|---|
| WO | 2010095159 A | 8/2010 |
| WO | 2011032265 A | 3/2011 |
| WO | 2011101030 A | 8/2011 |
| WO | 2011126346 A | 10/2011 |
| WO | 2011129473 | 10/2011 |
| WO | 2011129473 A1 | 10/2011 |
| WO | 2011131631 A | 10/2011 |
| WO | 2012056212 A | 5/2012 |
| WO | 2012079729 A | 6/2012 |
| WO | 2012127334 A | 9/2012 |
| WO | 2012128803 A | 9/2012 |
| WO | 2012154921 A | 11/2012 |
| WO | 2013012677 A | 1/2013 |

OTHER PUBLICATIONS

Co-Pending Application No. FI 20145879 filed Oct. 7, 2014.
Co-Pending Application No. JP 2014-177000 filed Sep. 1, 2014.
Co-Pending U.S. Appl. No. 13/921,788, filed Jun. 19, 2013, published as US Publication No. 2014/0376289 on Dec. 25, 2014, issued as U.S. Pat. No. 9,270,164 on Feb. 23, 2016.
Co-Pending U.S. Appl. No. 14/537,104, filed Nov. 10, 2014, published as US Publication No. 2015/0134251 on May 14, 2015.
Gaztañaga, H et al., Enhanced Experimental PV Plant Grid-Integration with a MW Lithium-Ion Energy Storage System, IEEE, 2013, pp. 1324-1329.
Krueger, B et al., Controlling of Medium Voltage Power-Factor of Photovoltaic Power Plants from the Low Voltage Side, IEEE, 2013, pp. 569-574.
Co-pending Finland Application No. 20145879, First Office Action Sep. 22, 2016 with Search Report and Cited References, 99 pages.
Sauer, P.W., Chapter 2, "Reactive Power and Voltage Control Issues in Electric Power Systems", Applied Mathematics for Restructured Electric Power Systems, 2005.
Co-pending Finland Application No. 20145879, Response (and translation) to Sep. 22, 2016 First Office Action, Response Filed Jan. 19, 2017, 24 pages.

* cited by examiner

RENEWABLE ENERGY SITE REACTIVE POWER CONTROL

BACKGROUND OF THE INVENTION

Field of the Invention

The present invention relates to control of reactive power at a renewable energy site. More particularly, the present invention relates to improvements on traditional renewable energy site reactive power and voltage control systems subject to utility voltage and reactive power limits and significant control loop delay.

Description of Related Art

Renewable energy sites are typically composed of multiple power conversion devices connected in parallel generating fixed frequency AC power to a grid. The devices are typically AC-AC or DC-AC inverters. Inverters are designed to extract maximum power from the renewable power supply, subject to a real power limit reference and often, a reactive power or voltage command.

A typical reactive power control system measures site total power feedback, reactive power and site voltage to actively control them. The site control loop consists of commands from the controller to the inverters and feedbacks from the inverters or a utility meter to the site controller. Reactive power control runs concurrently and relatively independently of real power control. The site controller typically generates a site level reactive power command and divides this by the number of online inverters to obtain individual inverter commands. A reactive power controller regulates site voltage or power factor, but not both at once since voltage and reactive power are mutually dependent. Furthermore, reactive power and voltage commands are subject to site voltage and power factor operating limits. Local reactive power controllers residing in inverters are typically much faster than the remote site control loop. Therefore it is important to implement as much control functionality by the inverter itself, if possible.

The system overview for an example system with 4 inverters is shown in FIG. 1. The site control loop 10 consists of commands 23 from the controller 12 to the inverters 18 and feedbacks 21 from the inverters 18 or a utility meter 14 back to the site controller 12. The inverters 18 are connected to a power source 16 such as a photovoltaic (PV) module, and a step-up transformer 20 may intervene between the inverters 18 and the power meter 14. A point-of-control (POC) 15 is located next to the power meter 14 before the point of interconnection (POI) 17 with the utility.

The traditional controller is composed of an inner voltage control loop and an outer reactive power loop. FIG. 2 shows an example of a traditional controller 30. The inner voltage loop generates a reactive power command for the site ($QCOM_{SITE}$) 59 that may be converted to a reactive power command for each inverter ($QCOM_{INVERTER}$) 65 by division 64 by the number of inverters online 61. $QCOM_{INVERTER}$ 65 maintains voltage at either a fixed voltage reference ($V_{REF}$) 41, or a dynamic voltage reference ($V_{COM}$) 39. The choice of voltage reference 45 is determined by the reactive power mode 42: voltage control ($V_{REF}$ 41) or power factor control ($V_{COM}$ 39). Power factor control feeds the error ($Q_{ERR}$) 37 resulting from subtraction 32 of the reactive power feedback ($Q_{FBK}$) 31 from the sum of the reactive power compensation ($Q_{COMP}$) 35 and the reactive power reference ($Q_{REF}$) 33 (generated from a power factor reference) into a PI controller 38 to generate the dynamic voltage reference ($V_{COM}$) 39. Thus, this controller offers a way to control voltage or power factor, depending on the reactive power mode. The voltage reference 45 is subject to voltage limits 46, and the voltage feedback 49 is subtracted 48 from the limited voltage reference 47 to generate a voltage error ($V_{ERR}$) 51. The voltage error ($V_{ERR}$) 51 is fed into a PI controller 52 to generate a reactive power command 55 which is subject to limits 56 before the site reactive power command ($QCOM_{SITE}$) 59 is generated.

However, traditional controllers can be improved significantly. The following shortcomings are present in a typical two-loop site controller.

1. Instability in reactive power control mode due to loop phase lag and delay. In reactive power control mode, the two series PI controllers can contribute excessive phase lag when the P gain is low, which decreases controller stability. (The classical two-loop technique is beneficial when the inner loop (voltage control, in this case) has a much faster response than the outer loop. However there is minimal benefit in this case, since voltage and reactive power are mutually dependent).

2. Large transients occurring when switching control modes or breaching voltage or reactive power thresholds, or when changing references, due to loop delay.

3. There is no means to apply reactive power threshold control during voltage control. Although the traditional two-loop structure conveniently implements voltage limits during power factor control, it does not impose reactive power limits during voltage control.

Various power controllers have been disclosed, such as those described in U.S. Pat. No. 7,923,862, U.S. Pat. No. 7,890,217, U.S. Pat. No. 6,512,966, and U.S. Published Patent Application No. 2010/0145532, have failed to overcome the limitations described herein. Thus, there is a need for an improved method of renewable power plant reactive power control with improved dynamic performance.

SUMMARY OF THE INVENTION

To this end, the present invention provides an improved method, computer program product, controller device, and system for reactive power control at a renewable energy site. The present invention addresses dynamic performance problems associated with significant control loop delay and the changing modes of operation required to meet utility voltage and reactive power constraints. Key elements include a reactive power control term based on the sum of a single integrator and reactive power compensation term, an integrator anti-windup mechanism based on the status of individual inverters, a means for decreasing detrimental effects of loop delay during reactive power reference changes, and a means of implementing voltage and power factor limits with smooth transfer between reactive power operating regions.

In addition, the following features of the present invention provide significant advantageous over prior art controllers and one or more or all of the following features can be included in various embodiments of the invention:

1. Reactive power compensation which bypasses the control loop and its susceptibility to loop delay. In conjunction with the error integrator, a reactive power compensation term enables the controller to obtain faster dynamic performance, while still maintaining zero steady-state error.

2. A single integrator fed by error from one of four sources depending on reactive power mode and whether voltage or reactive power thresholds have been breached:

a. Voltage error
b. Voltage threshold error
c. Reactive power error
d. Reactive power threshold error 3. Using linear switches to transition between power factor and voltage control modes and to transition in and out of signal threshold control modes.

4. Integrator anti-windup based on the status of individual inverters.

5. Integration error and antiwindup modifications for reducing the detrimental effects of loop delay.

FIG. 3 shows a high-level summary of the present invention as embodied in an improved reactive power controller 100. In brief, the reactive power controller 100 calculates 120 a voltage (V) and reactive power (Q) error and threshold error based in part on one or more or all of the following six data inputs: reactive power reference ($Q_{REF}$) 309, reactive power feedback ($Q_{FBK}$) 411, reactive power upper and lower limits ($Q_{LIMIT}$) 105, voltage reference ($V_{REF}$) 633, voltage feedback ($V_{FBK}$) 511, and voltage upper and lower limits ($V_{LIMIT}$) 115. In embodiments, a linear switch 970 can be used to determine the transition between power factor and voltage control modes, thereby determining whether the error 995 fed to the integrator 1000 is the reactive power error 895 or voltage error 885. The linear switch 970 transition rate is determined by the reactive power slew ($Q_{SLEW}$) 855. The integral calculator 1000 calculates a reactive power integral 1085 based on the error 995, and the reactive power integral 1085 is summed 1210 with a reactive power compensation term ($Q_{COMP}$) 331 to generate a site-wide reactive power command ($QCOM_{SITE}$) 1295. The reactive power command ($QCOM_{SITE}$) is distributed 2000 based on inverter reactive power feedback ($INV.Q_{FBK}$) 2105 to generate an inverter reactive power command ($Inv.Q_{COMM}$) 2151. The reactive power distribution 2000 also increments a counter (NumQFree) 2255 which indicates the number of inverters producing less than maximum reactive power, which is used to determine the integral.

Thus, unlike the traditional controller which distributes a single reactive power command to all inverters, the present invention uses a reactive power distribution function which computes individual inverter reactive power commands from the site total reactive power command. In embodiments, the site total reactive power command can be distributed or divided evenly among all or some of the inverters or can be distributed or divided unevenly among all or some of the inverters.

One embodiment of the invention is a method for reactive power control for a renewable energy site that comprises one or more inverters, comprising: (a) providing machine-readable data related to a renewable energy site to at least one processor, wherein the machine-readable data comprises reactive power feedback ($Q_{FBK}$), reactive power upper (Q_UL) and lower (Q_LL) limits, a voltage reference (SiteVRef), voltage feedback ($V_{FBK}$), voltage upper (V_UL) and lower (V_LL) limits, a power factor reference ($PF_{REF}$) and a power feedback $P_{FBK}$; and (b) performing the following steps through the at least one processor: (1) calculating at least one of the following sources of error: (aa) a reactive power error (SiteQErr) based in part on $Q_{FBK}$ and $P_{FBK}$; (bb) a gain-multiplied voltage threshold error based in part on $V_{FBK}$, V_UL, and V_LL; (cc) voltage error (SiteVErr) based in part on $V_{FBK}$ and Vref; (dd) a gain-multiplied reactive power threshold error based in part on $Q_{FBK}$, Q_UL, and Q_LL; (2) selecting a source of error based in part on choosing between a power factor control mode and a voltage control mode; (3) inputting the error to an integrator, to provide an error integral ($Q_{INT}$); (4) calculating a reactive power compensation term ($Q_{COMP}$) based in part on $PF_{REF}$ and $P_f$; and (5) adding $Q_{INT}$ to $Q_{COMP}$ to yield a site-wide reactive power command ($Q_{COM}$).

Another embodiment of the invention is a computer-readable medium including instructions that, when executed on a computer, cause a computer to provide the machine-readable data to the at least one processor and perform the steps described above through the at least one processor.

Other embodiments include a reactive power controller device comprising at least one processor, a form of computer-readable memory; and a set of computer-executable instructions configured to provide the machine readable data to the least one processor and perform the steps described above using the at least one processor.

Another embodiment of the invention is a system comprising the reactive power controller device above comprising one or more inverters in a two-way communication with the reactive power controller through a network.

In another embodiment of the invention, the machine-readable data further comprises inverter power feedbacks ($Inv.P_{FBK}$) and the at least one processor distributes $Q_{COM}$ to individual inverters based on the inverter power feedbacks ($Inv.P_{FBK}$) by generating an inverter reactive power command (Inv[x].QCom[k]).

BRIEF DESCRIPTION OF THE DRAWINGS

The accompanying drawings illustrate certain aspects of embodiments of the invention and should not be used to limit or define the invention. Together with the written description the drawings serve to explain certain principles of the invention.

DETAILED DESCRIPTION OF VARIOUS EMBODIMENTS OF THE INVENTION

Figure 1:
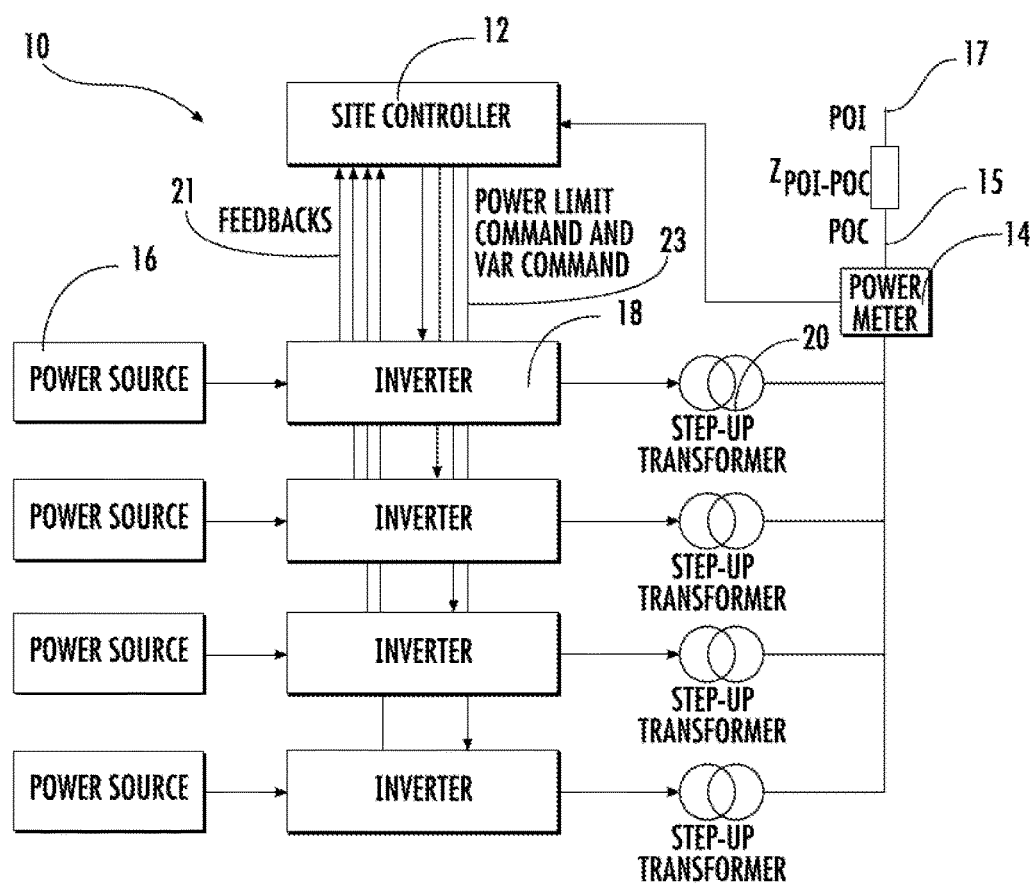
FIG. 1 is a schematic diagram showing an embodiment of a reactive power control system with four inverters.
Figure 2:
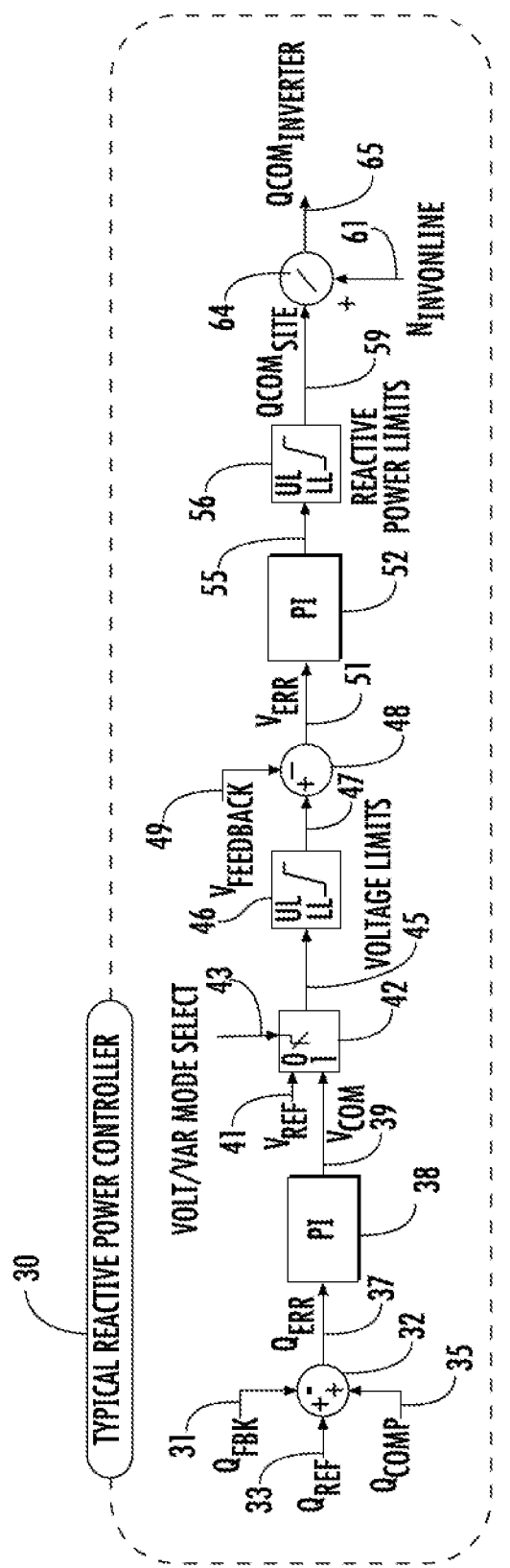
FIG. 2 is a block diagram showing a traditional reactive power controller.
Figure 3:
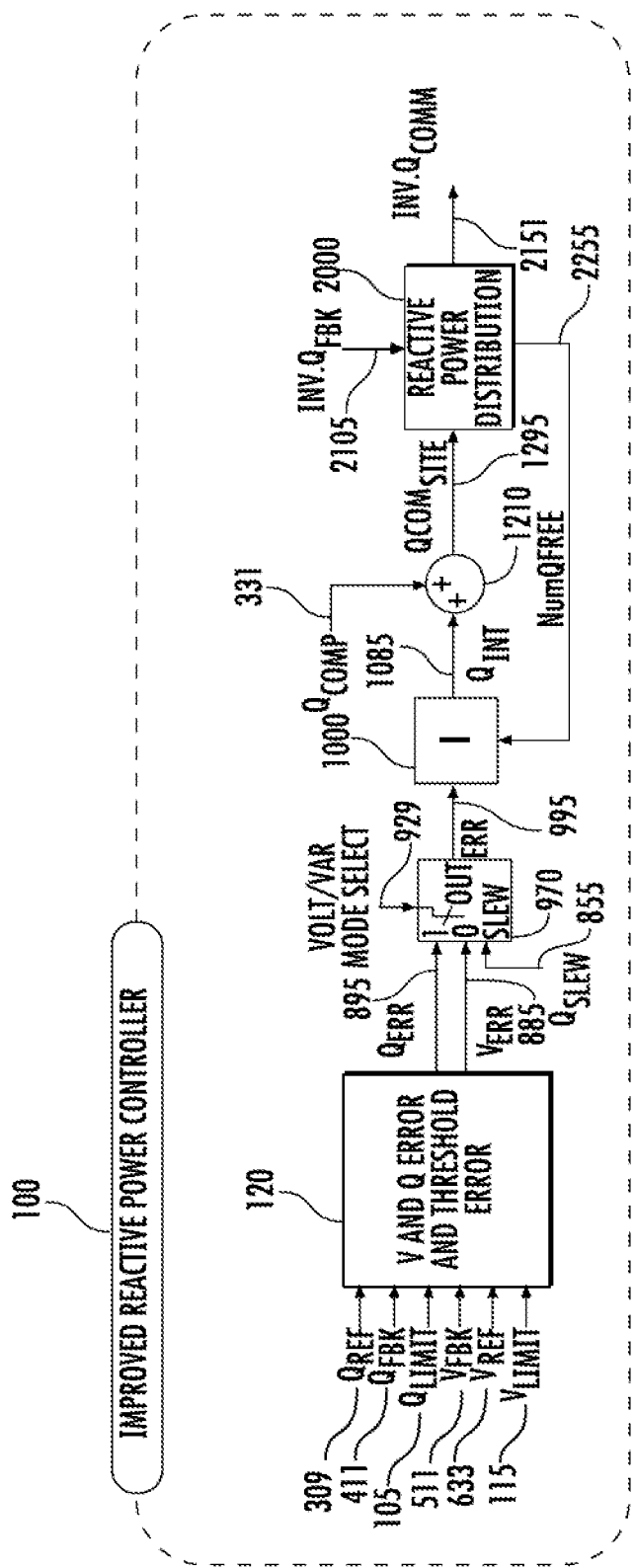
FIG. 3 is a block diagram showing an overview of an embodiment of an improved reactive power controller according to the invention.

Reference will now be made in detail to various exemplary embodiments of the invention. It is to be understood that the following discussion of exemplary embodiments is not intended as a limitation on the invention. Rather, the following discussion is provided to give the reader a more detailed understanding of certain aspects and features of the invention.

Embodiments of the present invention provide improved regulation of reactive power at a renewable energy plant that entails two modes of operation:

1. Power factor control—a closed loop regulator which controls site power factor without exceeding site voltage thresholds 2. Voltage control—a closed loop regulator which controls site voltage without exceeding site power factor thresholds.

Thus, embodiments of the invention provide for threshold control wherein reactive power limits are imposed during voltage control and voltage limits are imposed during reactive power control.

Further, in certain embodiments, the invention provides a site-wide reactive power command comprised of a sum of a reactive power feed-forward or compensation term and an integrator term, which is distributed among inverters. In an embodiment, the feed-forward term is a linear function of site real power feedback.

Still further, particular embodiments of the present invention provide a means of smoothly transitioning between control modes, such as a linear switch with fixed transition time.

In embodiments, the present invention comprises the feature of Integrator anti-windup based on either an upper limit computed at least partly from the maximum feedback power, or windup enabled logic based on the number of saturated inverters.

In certain embodiments, the present invention provides loop delay compensation implemented by:

1. Comparing the present inverter reactive power feedback signal with the corresponding reactive power reference generated LoopDelay seconds prior in order to determine if an inverter is saturated; and 2. Replacing the current site reactive power reference gain used to generate the site reactive power error with the site reactive power reference gain generated LoopDelay seconds prior. Since these two loop delay mitigation methods accomplish different goals, in preferred embodiments they are best used concurrently, ie, in the same method.

Specific embodiments of the invention provide for a method for reactive power control for a renewable energy site that comprises one or more inverters, the method comprising: (a) determining a site-wide reactive power command comprised by a sum of a reactive power feedforward or compensation term and an integrator term; and (b) distributing the site-wide reactive power command among inverters. In embodiments, such a reactive power command can be divided by the number of inverters to determine an inverter-specific reactive power command.

Such methods can be configured such that the feedforward term is a linear function of site real power feedback.

In embodiments, the determining of the site-wide reactive power command can be based on a power factor control subject to voltage threshold control or is based on a voltage control subject to power factor threshold control.

For example, the determining of the site-wide reactive power command can involve choosing between a power factor control mode and a voltage control mode and can be performed using a linear switch block with fixed transition time to transition between the power factor control and voltage modes.

Such methods can also comprise integrator anti-windup for example based on either an upper limit computed at least partly from the maximum feedback power, or windup enabled logic based on a number of saturated inverters.

Any of the methods of the invention can further comprise providing for LoopDelay compensation by: (a) comparing a present inverter reactive power feedback signal with a corresponding reactive power reference generated LoopDelay seconds prior to determine if an inverter is saturated, and (b) subtracting present inverter feedback signal from a reference generated LoopDelay seconds prior to compute an integration error term.

Embodiments of the invention further provide for a method for reactive power control for a renewable energy site that comprises one or more inverters, the method comprising any one or more of the following steps in any combination:

(1) providing data from a renewable energy site, wherein the data is chosen from one or more of:
 (a) reactive power feedback ($Q_{FBK}$);
 (b) reactive power upper (Q_UL) and lower (Q_LL) limits;
 (c) a voltage reference (SiteVRef);
 (d) voltage feedback ($V_{FBK}$);
 (e) voltage upper (V_UL) and lower (V_LL) limits;
 (f) a power factor reference ($PF_{REF}$); and
 (g) a power feedback $P_{FBK}$; and (2) calculating at least one source of error as:
 (a) a reactive power error (SiteQErr) based in part on $Q_{FBK}$ and $P_{FBK}$;
 (b) a gain-multiplied voltage threshold error based in part on $V_{FBK}$, V_UL, and V_LL;
 (c) voltage error (SiteVErr) based in part on $V_{FBK}$ and Vref;
 (d) a gain-multiplied reactive power threshold error based in part on $Q_{FBK}$, Q_UL, and Q_LL;

(3) selecting the source of error to be calculated based in part on choosing between a power factor control mode and a voltage control mode;

(4) inputting the error into an integrator to provide an error integral ($Q_{INT}$);

(5) calculating feed-forward ($Q_{COMP}$) based in part on $PF_{REF}$ and $P_{FBK}$;

(6) adding $Q_{INT}$ to $Q_{COMP}$ to yield ($Q_{COM}$) a site-wide reactive power command;

(7) and distributing $Q_{COM}$ among one or more individual inverters.

According to embodiments, the listed references and limits provided in this specification are provided by a site operator who configures the site controller.

In embodiments, $Q_{COMP}$ is a linear function of site real power feedback ($P_{FBK}$) and is calculated by adding a reactive power offset (LRPCoffset) to the product of a reactive power gain multiplied by the power feedback ($P_{FBK}$).

The data provided in embodiments of the invention can comprise inverter power feedbacks (Inv.$P_{FBK}$) and can be configured such that the distributing of $Q_{COM}$ to the individual inverters is based on the inverter power feedbacks (Inv.$P_{FBK}$) by generating an inverter reactive power command (Inv[x].QCom[k]).

According to embodiments, the SiteQErr can be calculated:
 (a) based on a reactive power reference (SiteQrefGain) based on:

$$SiteQrefGain = -\text{sign}(PF_{ref})\sqrt{\frac{1}{PF_{ref}} - 1}$$

(b) and based on a gain $K_{1Q}$ based on:

$$SiteQErr=(SiteQrefGain[k]*P_{fb}-Q_{fb})K_{IQ}.$$

Likewise, the SiteVErr can calculated based on a gain $K_{IV}$ based on:

$$SiteVErr=(SiteVRef-V_{fbk})K_{IV}.$$

Methods of the invention can comprise choosing the power factor control mode and wherein when $Q_{FBK}$ is within Q_UL and Q_LL, the source of error is calculated as SiteVErr, or wherein when $Q_{FBK}$ exceeds Q_UL or Q_LL, the source of the error is calculated as the gain-multiplied reactive power threshold error which is a reactive power threshold error multiplied by gain $K_{IQ}$.

Similarly, methods can comprise choosing the voltage control mode and wherein when $V_{FBK}$ is within V_UL and V_LL, the source of the error is calculated as SiteQErr, or wherein when $V_{FBK}$ exceeds V_UL and V_LL, the source of the error is calculated as the gain-multiplied voltage threshold error which is a voltage threshold error multiplied by gain $K_{IV}$.

Loop delay compensation according to methods of the invention can for example be implemented by comparing a present inverter reactive power feedback signal with a corresponding reactive power reference generated LoopDelay seconds prior to determine if an inverter is saturated or by subtracting present inverter feedback signal from a corresponding reference generated LoopDelay seconds prior to compute an integration error term.

In embodiments, loop delay compensation can be performed in a manner such that (a) SiteQRefGain[k] is offset by a LoopDelay term D and SiteQRefGain[k] is replaced by SiteQRefGain[k-D], or such that (b) Inv[x].QCom[k] is offset by a LoopDelay term D and Inv[x].QCom[k] is replaced by Inv[x].QCom[k-D].

Such embodiments can comprise integrator anti-windup based on either an upper limit computed at least partly from the maximum feedback power, or windup enabled logic based on a number of saturated inverters.

Such embodiments can comprise choosing between a power factor control mode and a voltage control mode is performed using a linear switch block with fixed transition time to transition between the power factor control and voltage modes.

The linear switch block of embodiments can be operably configured to transition an error in and out of threshold modes at a steady slew rate by incrementing a variable, switch, by a parameter, QSlewInc, while the threshold limit input is 1 and decrementing switch by QSlewInc while the threshold limit input is 0 such that output of the linear switch block is given by:

$$out=in1*switch+in0*(1-switch)$$

wherein switch is limited to between 0 and 1.

The data provided according to methods of the invention can include a reactive power output (Inv[x].$Q_{FBK}$) and a new calculated integrator value ($Q_{ERR}$), where a counter (NumQFree) increments by one for each inverter with Inv[x].$Q_{FBK}$ substantially equal to Inv[x].QCom[k], such that $Q_{ERR}$ continues to be incremented when an absolute value of the new integrator value is less than a previous integrator value, or NumQFree is greater than zero.

A system of reactive power control for a renewable energy site is also provided comprising: one or more inverters; and a reactive power controller in operable communication with at least one of the one or more inverters and operably configured to generate a site-wide reactive power command ($Q_{COM}$) by:

(1) providing data from a the site chosen from one or more of:

(a) reactive power feedback ($Q_{FBK}$);

(b) reactive power upper (Q_UL) and lower (Q_µL) limits;

(c) a voltage reference (SiteVRef);

(d) voltage feedback ($V_{FBK}$);

(e) voltage upper (V_UL) and lower (V_LL) limits;

(f) a power factor reference ($PF_{REF}$); and (g) a power feedback $P_{FBK}$; and (2) calculating at least one source of error as:

(a) a reactive power error (SiteQErr) based in part on $Q_{FBK}$ and $P_{FBK}$;

(b) a gain-multiplied voltage threshold error based in part on $V_{FBK}$, V_UL, and V_LL;

(c) voltage error (SiteVErr) based in part on $V_{FBK}$ and Vref;

(d) a gain-multiplied reactive power threshold error based in part on $Q_{FBK}$, Q_UL, and Q_LL;

(3) selecting the source of error to be calculated based in part on choosing between a power factor control mode and a voltage control mode;

(4) inputting the error into an integrator to provide an error integral ($Q_{INT}$);

(5) calculating a feed-forward term ($Q_{COMP}$) based in part on $PF_{REF}$ and $P_{FBK}$, and (6) adding $Q_{INT}$ to $Q_{COMP}$ to yield a site-wide reactive power command ($Q_{COM}$). Such systems can be configured such that the reactive power controller is operably configured to distribute the site-wide reactive power command ($Q_{COM}$) among one or more inverters which are enabled at the site. Data provided by such systems can include inverter power feedbacks (Inv.$P_{FBK}$) and the reactive power controller can be operably configured to distribute $Q_{COM}$ among individual inverters based on the inverter power feedbacks (Inv.$P_{FBK}$) by generating an inverter reactive power command (Inv[x].QCom[k]).

Also included in embodiments of the invention is a computer-readable medium including instructions that, when executed on a computer, cause a computer to:

(1) provide data from a renewable energy site, which is one or more of:

(a) reactive power feedback ($Q_{FBK}$);

(b) reactive power upper (Q_UL) and lower (Q_LL) limits;

(c) a voltage reference (SiteVRef);

(d) voltage feedback ($V_{FBK}$);

(e) voltage upper (V_UL) and lower (V_LL) limits;

(f) a power factor reference ($PF_{REF}$); and (g) a power feedback $P_{FBK}$; and (2) calculate at least one source of error as:

(a) a reactive power error (SiteQErr) based in part on $Q_{FBK}$ and $P_{FBK}$;

(b) a gain-multiplied voltage threshold error based in part on $V_{FBK}$, V_UL, and V_LL;

(c) voltage error (SiteVErr) based in part on $V_{FBK}$ and Vref;

(d) a gain-multiplied reactive power threshold error based in part on $Q_{FBK}$, Q_UL, and Q_LL;

(3) select the source of error to be calculated based in part on choosing between a power factor control mode and a voltage control mode;

(4) input the error into an integrator to provide an error integral ($Q_{INT}$);

(5) calculate a feed-forward term ($Q_{COMP}$) based in part on $PF_{REF}$ and $P_{FBK}$; and (6) add $Q_{INT}$ to $Q_{COMP}$ to yield a site-wide reactive power command ($Q_{COM}$). Such computer-readable media can include instructions that, when executed on a computer, cause a computer to distribute $Q_{COM}$ among one or more individual inverters which are enabled at the site. Even further, the computer-readable medium can be configured to include data comprising inverter power feedbacks (Inv.$P_{FBK}$) and to provide instructions capable of causing a computer to distribute $Q_{COM}$ among individual inverters based on the inverter power feedbacks (Inv.$P_{FBK}$) by generating an inverter reactive power command (Inv[x].QCom [k]).

Details of embodiments of the present invention will now be referred to in block diagrams that illustrate the processes and operations of methods, systems, controller devices, and/or computer program products according to the invention. However, there may be variations in the order of these operations, elimination of one or more operations, or substitution or addition of one or more new operations, that fall within the scope of the invention as appreciated by a skilled artisan.

Site Reactive Power Compensation/Control

Figure 4:
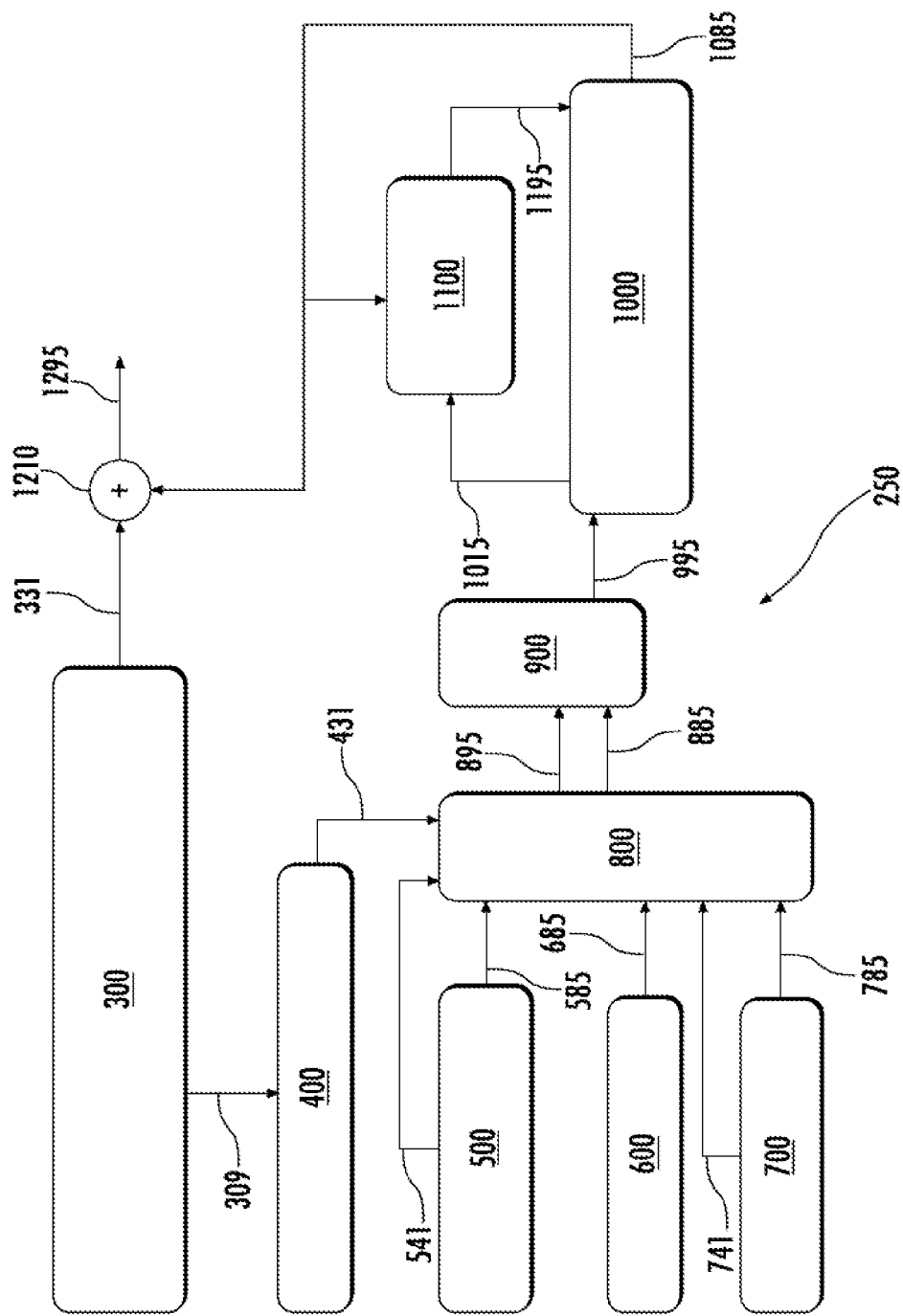
FIG. 4 is a block diagram showing an overview of an embodiment of the Site Reactive Power Compensation Control according to the invention.

FIG. 4 is an overview of an embodiment of The Site Reactive Power Compensation/Control 250 and the basic interrelation of its calculations and operations, which result in generation of the site total reactive power command, $Q_{COM}$.

In this embodiment, the Reactive Power Compensation (Feed-forward Term) Calculation 300 computes a site reactive power reference gain (SiteQrefGain) 309 and a reactive power error feed-forward compensating command ($Q_{COMP}$) 331. The two main sources of error, site reactive power error (SiteQErr) 431 and site voltage error (SiteVErr) 685, are calculated through the Reactive Power Error Calculation 400, which uses the site reactive power reference gain (SiteQRefGain) 309 as an input, and the Voltage Error Calculation 600, respectively. Site reactive power error (SiteQErr) 431 and site voltage error (SiteVErr) 685 are inputted to a Threshold Mode Transitioning Operation 800. A Voltage Threshold Error Operation 500 can be used to determine 541 whether Threshold Mode applies to the Reactive Power Error, in which case a scaled voltage threshold error is supplied 585 so that site voltage thresholds are not exceeded. Similarly, a Reactive Power Threshold Error Operation 700 can be used to determine 741 whether Threshold Mode applies to the Voltage Error, in which case a scaled reactive power threshold error is supplied 785 so that the site power factor thresholds are not exceeded.

A Reactive Control Mode Transitioning Operation 900 determines whether the controller is in Power Factor Control mode or Voltage Control mode. In Power Factor mode, the source of the error ERR 995 is the reactive power error ($Q_{ERR}$) 895, while in Voltage Mode, the source of the error ERR 995 is voltage error ($V_{ERR}$) 885. The ERR 995 is inputted to a Reactive Power Error Integral Calculation 1000 which feeds the incremented error 1015, 1085 to an Integral Antiwindup 1100, which determines 1195 whether the integration is continued or halted. The error integral term ($Q_{INT}$) 1085 is then added 1210 to the feed-forward compensation command ($Q_{COMP}$) 331; the sum of these two components is the reactive power command ($Q_{COM}$) 1295.

Inverter Reactive Power Distribution

As will be described in further detail below, the site-wide reactive power command $Q_{COM}$ 1295 and inverter power feedbacks, Inv.$P_{FBK}$, are processed by a Site Reactive Power Distribution function which produces individual reactive power commands for each inverter, Inv.QCom[k].

Computing Integrator Error, ERR

In embodiments, for Power Factor Control mode, PFmode is 1 and the error term, ERR 995, feeding the Error Integral Calculator 1000 is normally supplied by the scaled reactive power error, SiteQErr 431. However, if the site voltage feedback, $V_{FBK}$, exceeds the high voltage threshold, V_UL, or the low voltage threshold, V_LL (i.e. Voltage Threshold Mode), ERR is supplied by the product 585 of the voltage threshold error and the voltage error gain, K_IV.

For voltage regulation, PFmode is 0 and ERR is normally supplied by the scaled site voltage error, SiteVErr 685. However, if the site reactive power feedback $Q_{FBK}$, exceeds the reactive power upper limit, Q_UL, or the reactive power lower limit, Q_LL (Reactive Power Threshold Mode), then ERR is supplied by the product 785 of reactive power threshold error and a gain, $K_{IQ}$.

The following disclosure describes the processes and operations for each of the functions of the site reactive power controller 250 and inverter reactive power distribution 2000 in detail.

Feed-Forward Term (Qcomp) Calculation 300

Figure 5:
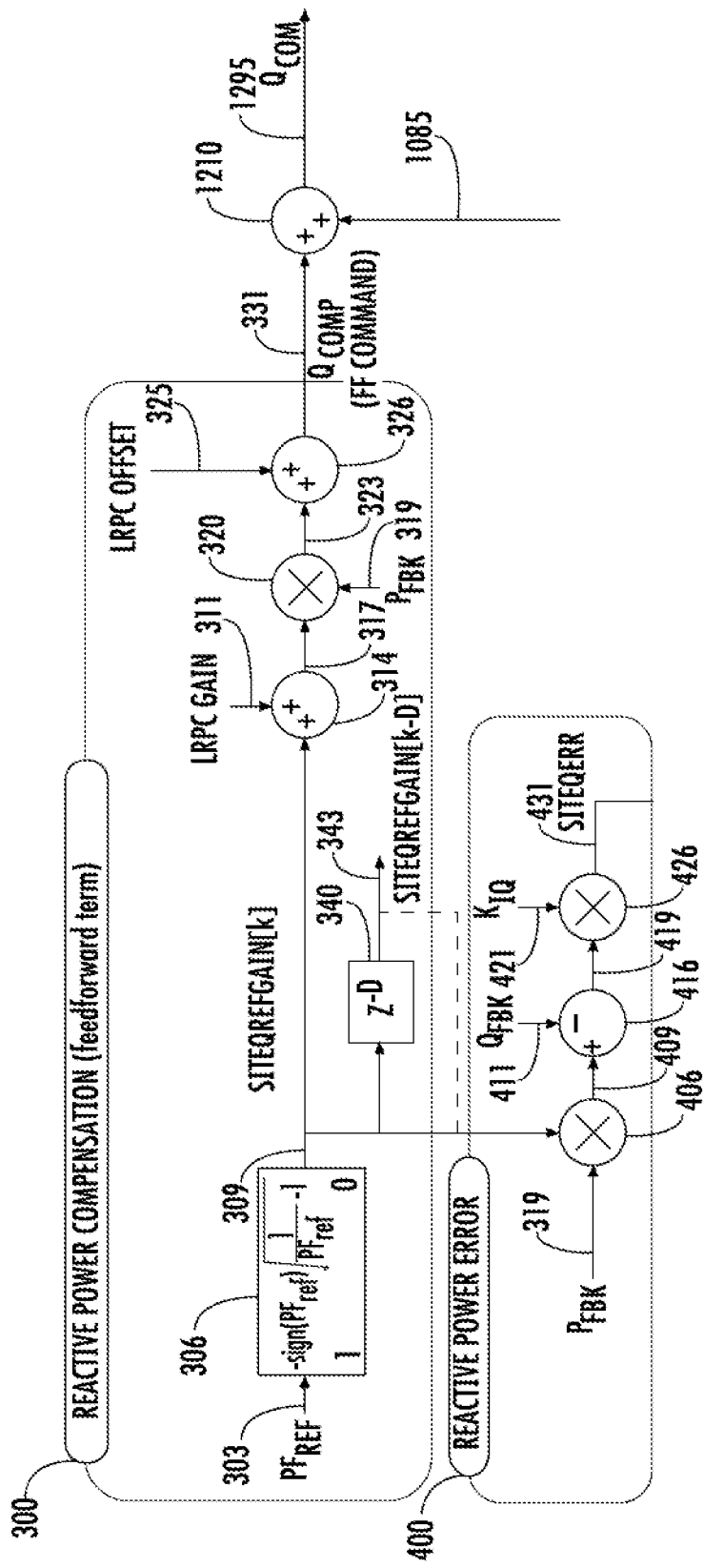
FIG. 5 is a block diagram showing embodiments of the Reactive Power Compensation (Feed-forward Term) Calculation and the Reactive Power Error Calculation according to the invention.

FIG. 5 shows embodiments of the Reactive Power Compensation (Feed-forward Term) Calculation 300 and the Reactive Power Error Calculation 400. The reactive power compensation feed-forward term ($Q_{COMP}$) 331, is a linear function of site real power feedback ($P_{FBK}$). The feed-forward term ($Q_{COMP}$) 331 is calculated by the addition 326 of a reactive power offset, LRPCoffset 325, to the product 323 of a reactive power gain 317 multiplied 320 by the power feedback ($P_{FBK}$) 319. The reactive power gain 317 is the sum 314 of a constant, LRPCgain 311, and a site reactive power reference, SiteQrefGain 309, which is computed 306 from the power factor reference ($PF_{REF}$) 303 as follows:

$$SiteQrefGain = -\operatorname{sign}(PF_{ref})\sqrt{\frac{1}{PF_{ref}} - 1} \qquad 306$$

The values LRPCoffset 325 and LRPCgain 311 are set by the site operator. These are related to static site reactive power load and grid impedance between inverters and the site power meter respectively. $PF_{REF}$ is the operator specified power factor reference. Tuning these parameters provides an open loop compensation command which can provide either power factor compensation or voltage flicker compensation without feedback. Well-tuned LRPC gains result in lower reactive power error, reducing dependence on the closed loop error integrator, thereby reducing the influence of loop delay. The integrator drives any steady state error to zero.

Reactive Power Error Calculation 400

In an embodiment, the reactive power error (SiteQErr) 431 is calculated through multiplication 406 of the power feedback ($P_{FBK}$) 319 and the site reactive power reference (SiteQrefGain) 309, subtraction 416 of the reactive power feedback ($Q_{FBK}$) 411 from the product 409, and finally multiplication 426 of the difference 419 and a gain $K_{IQ}$ 421 to yield the site reactive power error (SiteQErr) 431. The following equation summarizes this calculation:

$$SiteQErr=(SiteQrefGain[k]*P_{fb}-Q_{fb})K_{IQ}$$

Voltage Threshold Error Calculation 500

Figure 6:
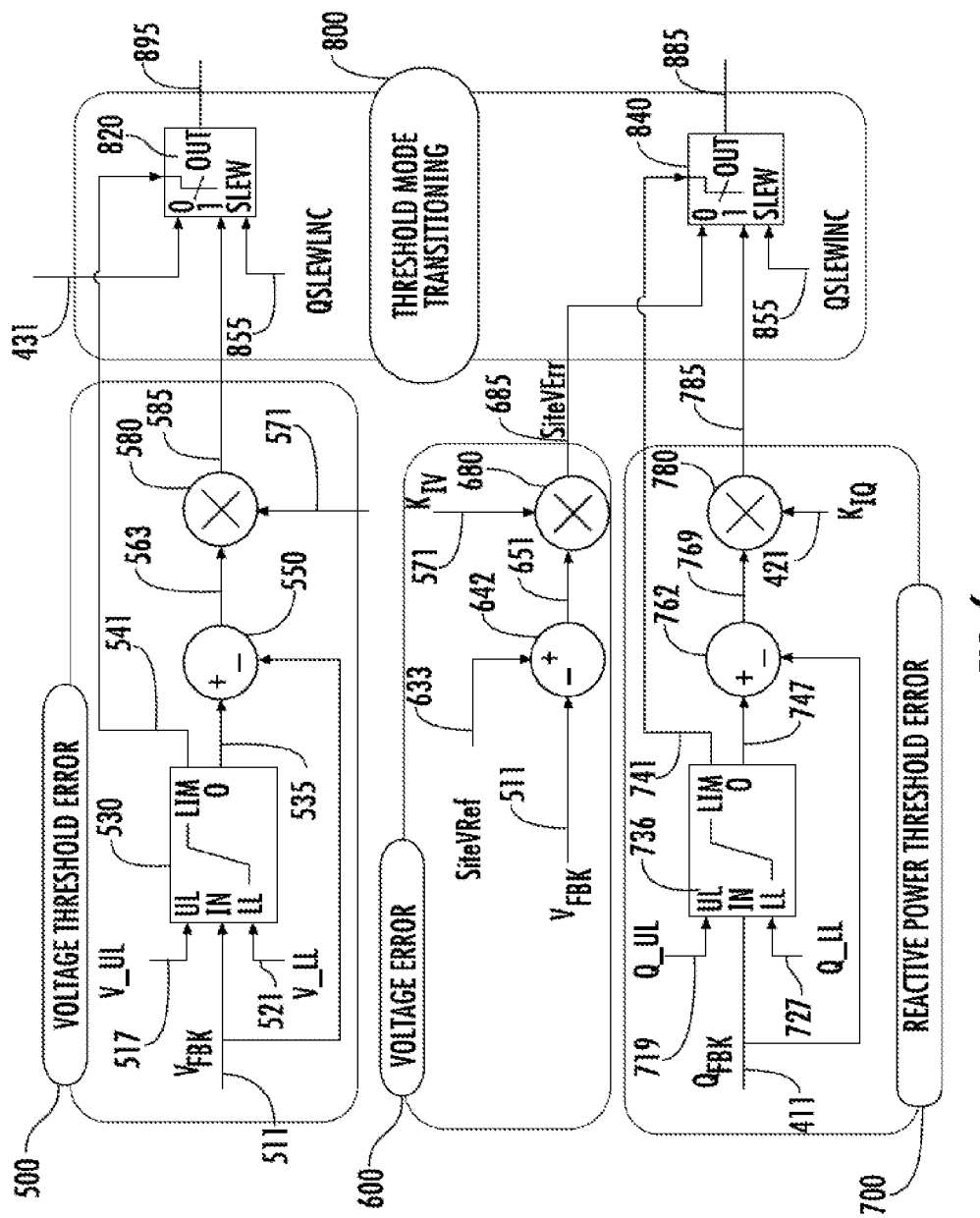
FIG. 6 is a block diagram showing embodiments of the Voltage Threshold Error Calculation, the Voltage Error Calculation, and the Reactive Power Threshold Error Calculation according to the invention

FIG. 6 shows embodiments of the Voltage Threshold Error Calculation 500, the Voltage Error Calculation 600, and the Reactive Power Threshold Error Calculation 700. As shown in FIG. 6, if the site voltage feedback ($V_{FBK}$) 511, exceeds the high voltage threshold, V_UL 517, or the low voltage threshold, V_LL 521, error (ERR) is supplied by the product 585 of voltage threshold error 563 multiplied 580 by and the voltage error gain, K_IV 571. The voltage threshold error 563 is calculated by subtraction 550 of $V_{FBK}$ 511 from the threshold-limited voltage feedback 535.

Voltage Error Calculation 600

As shown in the embodiment depicted in FIG. 6, the site voltage error (SiteVErr) 685 is calculated by subtraction 642 of the site voltage feedback ($V_{FBK}$) 511 from the site voltage reference (SiteVRef) 633, and then multiplication 680 of the difference 651 by a gain $K_{IV}$ 571 to yield the site voltage error (SiteVErr) 685. The following equation summarizes this calculation:

$$SiteVErr=(SiteVRef-V_{fbk})K_{IV}$$

Reactive Power Threshold Error Calculation 700

As shown in the embodiment depicted in FIG. 6, the reactive power threshold is calculated as follows. If the site reactive power feedback ($Q_{FBK}$) 411, exceeds the high reactive power threshold, Q_UL 719, or the low voltage reactive power threshold, Q_LL 727, ERR is supplied by the product 785 of reactive power threshold error 769 multiplied 780 by the reactive power error gain, $K_{IQ}$ 421. The reactive power threshold error 769 is calculated as $Q_{FBK}$ 411 subtracted 762 from the threshold-limited reactive power feedback 747.

Threshold Mode Transitioning Operation 800

As shown in the embodiment depicted in FIG. 6, two linear switch blocks are used to transition in and out of threshold control modes, wherein one switch block 820 is used to transition in and out of Voltage Threshold Error mode and the other switch block 840 is used to transition in and out of Reactive Power Threshold Error mode. For example, when $V_{FBK}$ 511 stays within upper V_UL 517 and lower V_LL 521 limits, the limiter block 530 instructs 541 the voltage threshold error switch block 820 to set threshold limit input to 0, such that the source of the reactive power error $Q_{ERR}$ 895 is the site reactive power error (SiteQErr) 431; otherwise the source is the product 585 of voltage threshold error 563 multiplied 580 by $K_{IV}$ 571. Similarly, when reactive power feedback ($Q_{FBK}$) 411 stays within upper Q_UL 719 and lower Q_LL 727 limits, the limiter block 736 instructs 741 the reactive power threshold error switch block 840 to set threshold limit input to 0, such that the source of the voltage error ($V_{ERR}$) 885 is the site voltage error (SiteVErr) 685; otherwise the source is the product 785 of the reactive power threshold error 769 multiplied 780 by $K_{IQ}$ 421.

Reactive Control Mode Transitioning Operation 900

Figure 7:
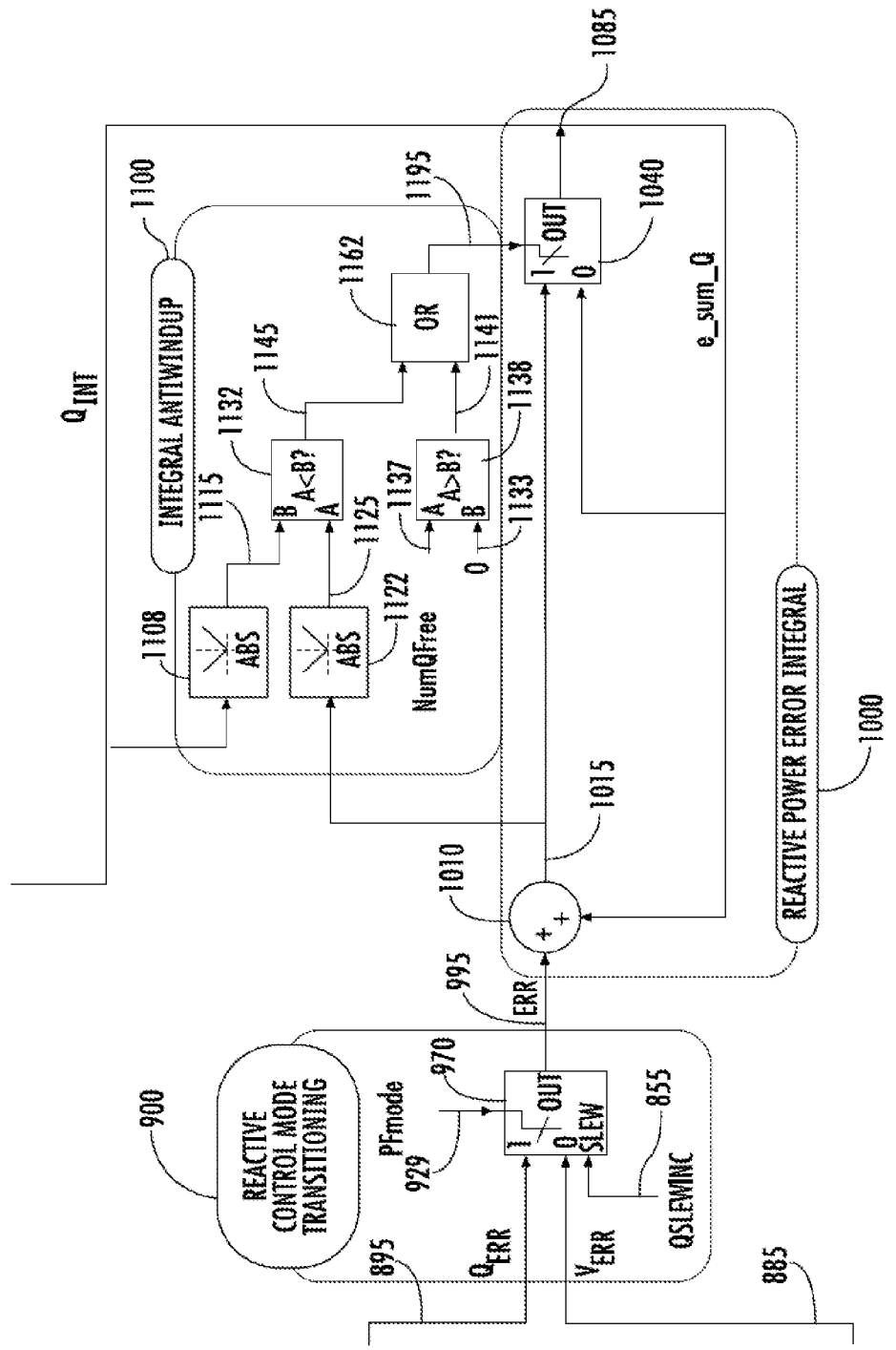
FIG. 7 is a block diagram showing embodiments of the Error Integral Calculation with Integral Anti-Windup according to the invention.

As shown in FIG. 7, a similar switch block 970 is used to transition between Power Factor/Voltage Control modes (PFmode) 929, wherein the error (ERR) 995 feeding the Error Integral Calculation 1000 is supplied by the reactive power error ($Q_{ERR}$) when PFmode 929 is 1 (i.e. in power factor control mode), or otherwise ERR 995 is supplied by the voltage error ($V_{ERR}$) 885 when PFmode 929 is 0 (i.e. in voltage control mode). In embodiments, the mode is selected by the operator.

Switch Block Functioning

The switch blocks 820, 840, 970 output a signal which transitions smoothly from one input to the other at a steady slew rate by incrementing a variable, switch, by the parameter QSlewInc 855 while the threshold limit or PF Mode input is 1 and decrementing switch by QSlewInc while the threshold limit or PF Mode input is 0. The switch block output is given by:

$$out=in1*switch+in0*(1-switch)$$

where switch is limited between 0 and 1.

These switch blocks are the key to providing a smooth, stable transition between operating modes. Without them, large oscillations often occur during mode transitions. Switching between error sources rather than adding error sources (as seen in literature) also eliminates the need for threshold error integration, which reduces controller stability due to extra phase lag.

Reactive Power Error Integral Calculation 1000 and Integral Antiwindup 1100

The error integral $Q_{INT}$, increments according to an error, ERR 995, that corresponds to the current operating mode. Integrator anti-windup logic improves the transient response during site saturation. Anti-windup is implemented by allowing integration when at least one of the following two conditions is true:

1. The absolute value of the new computed integrator value is less than the previous one.

2. At least one inverter has been deemed capable of generating more reactive power, i.e., NumQFree is greater than zero.

Figure 8:
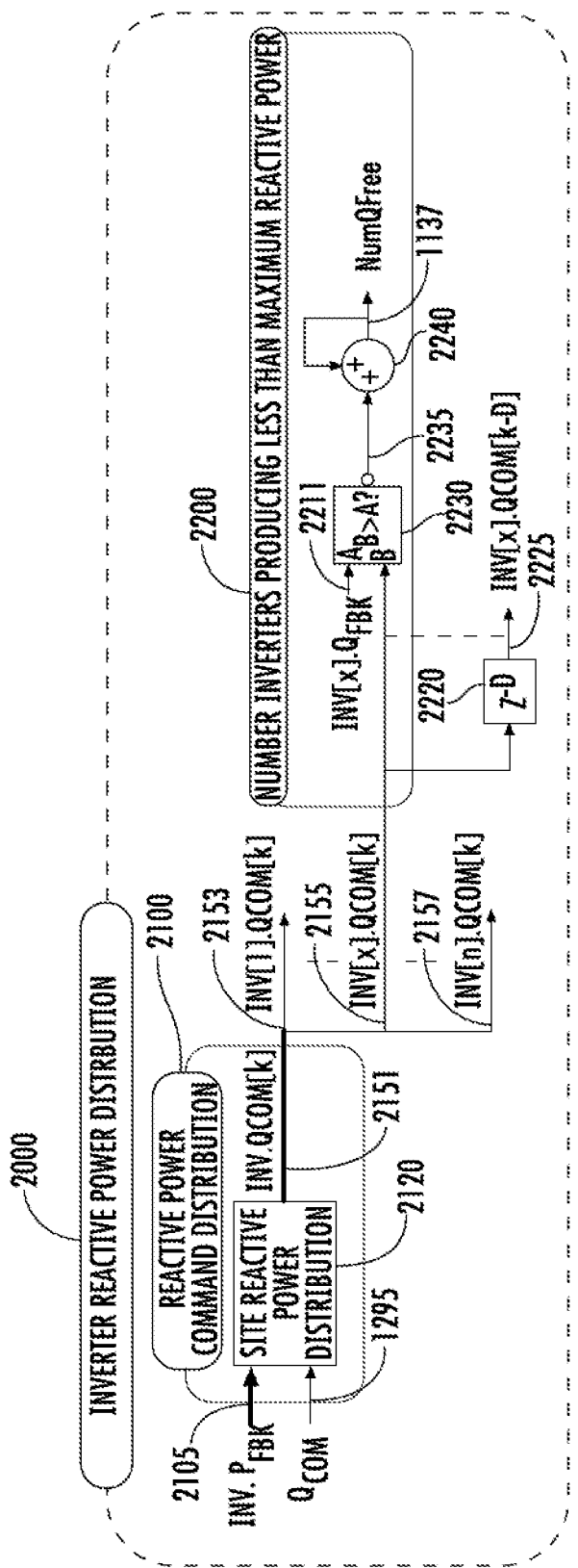
FIG. 8 is a block diagram showing an embodiment of the Inverter Reactive Power Command Distribution.

The second condition is determined at the inverter controller level by incrementing a counter, NumQFree, by one for each inverter with a reactive power output not significantly less than the reactive power command supplied to it (shown in FIG. 8). If NumQFree is equal to zero, indicating no inverters can produce more reactive power, the absolute value of the integrator will not be increased. In this context, and according to various embodiments of the invention, the term "not significantly less" can include a difference of up to 2%, 5%, 8%, 10%, 15%, 20%, 25%, 30%, 35%, 40%, 45%, or 50%.

FIG. 7 shows an embodiment of an Error Integral Calculation 1000 with Integral Anti-Windup 1100 in detail. As shown in FIG. 7, ERR 995 is summed 1010 in either two situations (as indicated by OR operator, 1162): situation 1141 when the number of free inverters (NumQFree) 1137 is greater than 1138 zero 1133 or situation 1145 when upon conversion 1108 and 1122 of the summed errors 1085 and 1015, respectively, to absolute values, A 1125 and B 1115, A is less than B 1132. When either of these conditions is present 1195, the switch block 1040 for continuing or halting the integrator is instructed to switch to 1, allowing the summed error e_sum_Q 1085 to be generated, if not, the integrator is halted such that the switch block 1040 is instructed to switch to zero.

Inverter Reactive Power Distribution 2000

FIG. 8 shows an embodiment of the Inverter Reactive Power Command Distribution 2100. As shown in FIG. 8, the Site Reactive Power Distribution function 2120 produces individual inverter reactive power commands Inv.Q.Com[k] 2151, which are sent to each inverter (e.g. Inv[1].QCom[k] 2153, Inv[x].QCom[k] 2155, Inv[n].QCom[k] 2157), based on site-wide reactive power command ($Q_{COM}$) 1295 and inverter power feedback (Inv.$P_{FBK}$) 2105. For example, a maximum reactive power, QComMax, can be calculated for each inverter based on the inverter power feedback, Inv[x].Pfbk, the site reactive power command, Qcom, and the number of enabled inverters, NumInvEn. The reactive power command, Inv[x].QCom[k], can then be set to the minimum of QComMax and the remaining site reactive power. The remaining site reactive power is initialized to the site reactive power command, Qcom, at the beginning of each control cycle and decremented by each inverter command as it is computed. This way, the total site power command is distributed among the inverters, but it will not necessarily be an equal distribution. According to embodiments of the invention, a basic equation for calculating maximum reactive power is:

$Q\text{comMax}=f(\text{Inv}[x].Pfbk,Q\text{com},\text{NumInvEn})$ $\text{Inv}[x].Q\text{Com}[k]=\min(Q\text{comMax},Q\text{com\_rem})$ $Q\text{com\_rem}=Q\text{com\_rem}-\text{Inv}[x].Q\text{com}[k]$ As shown in the embodiment depicted in FIG. 8, the inverter reactive power distribution level 2000 includes a function 2200 that increments 2240 a counter, NumQFree 1137, by one for each inverter when the following condition is present: reactive power output (Inv[x].$Q_{FBK}$) 2211 is not significantly less than the reactive power command (Inv[x].QCom[k]) 2155 supplied to it. When the reactive power command (Inv[x].QCom[k]) 2155 is greater than 2230 the reactive power output (Inv[x].$Q_{FBK}$) 2211, the counter is not incremented 2235.

Loop Delay Compensation

A component of embodiments of the present invention can include a simple method for correcting problems caused by loop delay. Delay presents a major challenge to any control loop and this application is no exception. In practice, there is a delay of a few seconds from site controller reactive power command output to inverter reactive power feedback. Compensating for such delay in embodiments is desirable.

In embodiments, loop delay compensation may be implemented by the following methods:

1. Comparing the present inverter reactive power feedback signal with the corresponding reactive power reference generated LoopDelay seconds prior in order to determine if an inverter is saturated.

2. Replacing the current site reactive power reference gain used to generate the site reactive power error with the site reactive power reference gain generated LoopDelay seconds prior.

In one embodiment, shown in FIG. 5, the site reactive power reference, (SiteQRefGain[k]) 309, supplying the error term in the site reactive power controller is replaced 340 by SiteQRefGain[k-LoopDelay/Ts], or just SiteQRefGain[k-LoopDelay] (SiteQRefGain[k-D]) 343, since the control period, Ts, is 1 second in this application. This prevents unnecessary windup during situations where the site reactive power is not saturated and therefore should not require integrator windup, since the inverters track their commands with high precision. This is an example of method 2 above.

In another embodiment, shown in FIG. 8 the reactive power command (Inv[x].QCom[k]) 2155, entering the logic block 2230 with inverter feedback reactive power (Inv[x].Qfbk) 2211 to generate an increment for NumQFree 1137, is replaced 2220 by Inv[x].QCom[k-LoopDelay] (Inv[x].QCom[k-D]) 2225. This change leads to more stable and reliable site level reactive power anti-windup. This is an example of method 1 above.

In certain embodiments of the invention, the Site Reactive Power Compensation/Control 250 and Inverter Reactive Power Distribution 2000 may include any number of software applications that are executed to facilitate any of the processes, calculations, and operations.

It will be understood that the various calculations, processes, and operations of the Site Reactive Power Compensation/Control 250 and the Inverter Reactive Power Distribution 2000 described and/or illustrated herein may be carried out by a group of computer-executable instructions that may be organized into routines, subroutines, procedures, objects, methods, functions, or any other organization of computer-executable instructions that is known or becomes known to a skilled artisan in light of this disclosure, where the computer-executable instructions are configured to direct a computer or other data processing device to perform one or more of the specified processes and operations.

Embodiments of the invention also include a computer readable medium comprising one or more computer files comprising a set of computer-executable instructions for performing one or more of the calculations, processes, and operations described and/or depicted herein. In exemplary embodiments, the files may be stored contiguously or non-contiguously on the computer-readable medium. Embodiments may include a computer program product comprising the computer files, either in the form of the computer-readable medium comprising the computer files and, optionally, made available to a consumer through packaging, or alternatively made available to a consumer through electronic distribution. As used in the context of this specification, a "computer-readable medium" includes any kind of computer memory such as floppy disks, conventional hard disks, CD-ROM, Flash ROM, non-volatile ROM, electrically erasable programmable read-only memory (EEPROM), and RAM.

In other embodiments of the invention, files comprising the set of computer-executable instructions may be stored in computer-readable memory on a single computer or distributed across multiple computers. A skilled artisan will further appreciate, in light of this disclosure, how the invention can be implemented, in addition to software, using hardware or firmware. As such, as used herein, the operations of the invention can be implemented in a system comprising any combination of software, hardware, or firmware.

Embodiments of the invention include one or more computers or devices loaded with a set of the computer-executable instructions described herein. The computers or devices may be a general purpose computer, a special-purpose computer, or other programmable data processing apparatus to produce a particular machine, such that the one or more computers or devices are instructed and configured to carry out the calculations, processes, and operations of the invention. The computer or device performing the specified calculations, processes, and operations may comprise at least one processing element such as a central processing unit (i.e. processor) and a form of computer-readable memory which may include random-access memory (RAM) or read-only memory (ROM). The computer-executable instructions can be embedded in computer hardware or stored in the computer-readable memory such that the computer or device may be directed to perform one or more of the processes and operations depicted in the block diagrams and/or described herein.

An exemplary embodiment of the invention includes a single computer or device that may be configured at a renewable energy site to serve as a single Main Site Controller (i.e. reactive power controller device). The Main Site Controller may comprise at least one processor, a form of computer-readable memory; and a set of computer-executable instructions for performing one or more of the calculations, processes, and operations described and/or depicted herein.

Figure 9:
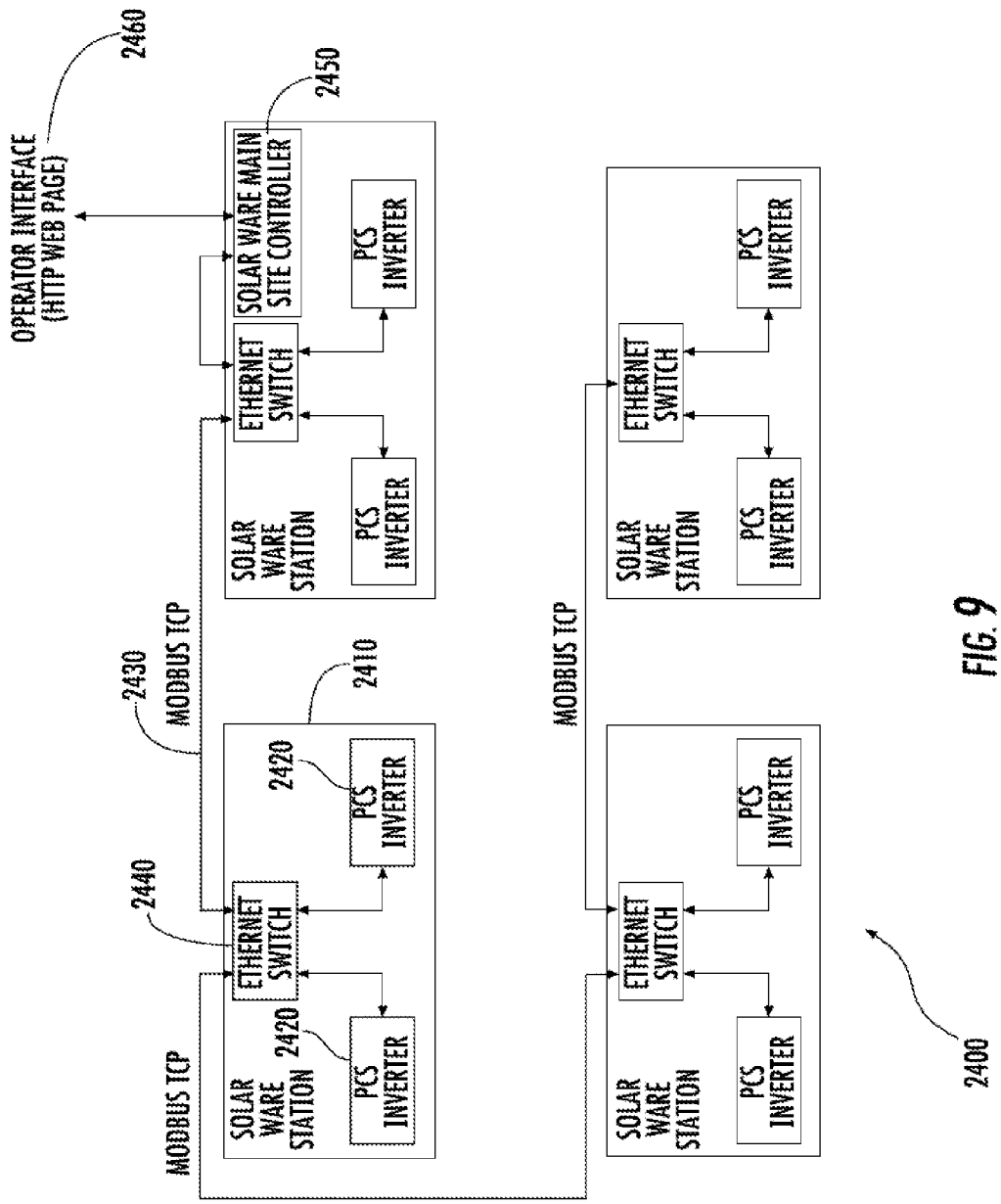
FIG. 9 is a schematic diagram showing an embodiment of a system for reactive power control according to the invention wherein a main site controller is configured for controlling a plurality of inverters through a network.

Another embodiment of the invention includes a system for reactive power control configured to include the Main Site Controller so that it receives feedbacks from the inverters and the site power meter and sends the reactive power commands through a network such as shown in FIG. 1 to one or more inverters of the renewable energy site. For example, FIG. 9 shows an embodiment of a renewable energy site system 2400 according to the invention comprising a plurality of solar ware stations 2410 comprising at least two inverters 2420. The solar ware stations 2410 of the system 2400 may be interconnected using Ethernet connectivity wherein data is transmitted between stations through a Modbus TCP protocol 2430. Commands and feedbacks may be sent to and from the inverters through a network interface such as an Ethernet switch 2440. However, any suitable network protocol, including IP, UDP, or ICMP, as well any suitable wired or wireless network including any local area network, Internet network, telecommunications network, Wi-Fi enabled network, or Bluetooth enabled network may be used. The Main Site Controller 2450 may be configured at one solar ware station 2410 to control the inverters 2420 as well as receive inputs from the inverters 2420 and from the site meter. The Main Site Controller 2450 may allow an operator to control the power at the renewable energy site through an operator interface which may be a graphical user interface (GUI) which may be present at the Main Site Controller itself or be presented as an HTTP webpage 2460 that may be accessed by the operator at a remote general purpose computer with a processor, computer-readable memory, and standard I/O interfaces such as a universal serial bus (USB) port and a serial port, a disk drive, a CD-ROM drive, as well as one or more user interface devices including a display, keyboard, keypad, mouse, control panel, touch screen display, microphone, etc. for interacting with the Main Site Controller through the GUI. The Main Site Controller 2450 may be used to control the reactive power of any renewable energy site employing one or more inverters that is connected to the public power grid, including but not limited to solar (photovoltaic), wind, and tidal energy sites.

The present invention has been described with reference to particular embodiments having various features. In light of the disclosure provided above, it will be apparent to those skilled in the art that various modifications and variations can be made in the practice of the present invention without departing from the scope or spirit of the invention. One skilled in the art will recognize that the disclosed features may be used singularly, in any combination, or omitted based on the requirements and specifications of a given application or design. Other embodiments of the invention will be apparent to those skilled in the art from consideration of the specification and practice of the invention.

It is noted in particular that where a range of values is provided in this specification, each value between the upper and lower limits of that range is also specifically disclosed. The upper and lower limits of these smaller ranges may independently be included or excluded in the range as well. The singular forms "a," "an," and "the" include plural referents unless the context clearly dictates otherwise. It is intended that the specification and examples be considered as exemplary in nature and that variations that do not depart from the essence of the invention fall within the scope of the invention. Further, all of the references, including e.g. all U.S. patents and all U.S. published patent applications, cited in this disclosure are each individually incorporated by reference herein in their entireties and as such are intended to provide an efficient way of supplementing the enabling disclosure of this invention as well as provide background detailing the level of ordinary skill in the art.

The invention claimed is:

1. A method for reactive power control for a renewable energy site that comprises one or more inverters, the method comprising:
    (a) determining a site-wide reactive power command ($Q_{COM}$) comprised by a sum of a reactive power error integrator term ($Q_{INT}$) and a reactive power compensation term ($Q_{COMP}$) that is a function of a power-factor reference ($PF_{REF}$) real power feedback ($P_{FBK}$) and a reactive power offset (LRPCoffset); and
    (b) distributing the site-wide reactive power command among the one or more inverters.

2. The method of claim 1, wherein the determining of the site-wide reactive power command is based on a power factor control subject to voltage threshold control or is based on a voltage control subject to power factor threshold control.

3. The method of claim 1, wherein the determining of the site-wide reactive power command involves choosing between a power factor control mode and a voltage control mode and is performed using a linear switch block with fixed transition time to transition between the power factor control mode and the voltage control mode.

4. The method of claim 1 further comprising integrator anti-windup based on either an upper limit computed at least partly from maximum feedback power, or windup enabled logic based on a number of saturated inverters.

5. The method of claim 1 further comprising: providing for LoopDelay compensation by: comparing a present inverter reactive power feedback signal with a corresponding reactive power reference which was computed LoopDelay seconds previously to determine if an inverter is saturated, and replacing current site reactive power reference gain used to generate site reactive power error with site reactive power reference gain generated LoopDelay seconds previously.

6. A method for reactive power control for a renewable energy site that comprises one or more inverters, the method comprising:
    (1) providing data from a renewable energy site chosen from one or more of:
        (a) reactive power feedback ($Q_{FBK}$);
        (b) reactive power upper (Q_UL) and lower (Q_LL) limits;
        (c) a voltage reference (SiteVRef);
        (d) voltage feedback ($V_{FBK}$);
        (e) voltage upper (V_UL) and lower (V_LL) limits;
        (f) a power factor reference ($PF_{REF}$); and
        (g) a power feedback ($P_{FBK}$); and
    (2) calculating at least one source of error as:
        (a) a reactive power error (SiteQErr) based in part on $Q_{FBK}$ and $P_{FBK}$;
        (b) a gain-multiplied voltage threshold error based in part on $V_{FBK}$, V_UL, and V_LL;
        (c) voltage error (SiteVErr) based in part on $V_{FBK}$ and Vref;
        (d) a gain-multiplied reactive power threshold error based in part on $Q_{FBK}$, Q_UL, and Q_LL;

(3) selecting the source of error to be calculated based in part on choosing between a power factor control mode and a voltage control mode;
(4) inputting the error into an integrator to provide an error integral ($Q_{INT}$);
(5) calculating a reactive power compensation term ($Q_{COMP}$) based in part on $PF_{REF}$ and $P_{FBK}$;
(6) adding $Q_{INT}$ to $Q_{COMP}$ to yield a site-wide reactive power command ($Q_{COM}$);
(7) and distributing $Q_{COM}$ among the one or more individual inverters.

7. The method of claim 6, wherein $Q_{COMP}$ is a linear function of site real power feedback ($P_{FBK}$) and is calculated by adding a reactive power offset (LRPCoffset) to the product of a reactive power gain multiplied by the power feedback ($P_{FBK}$).

8. The method of claim 7, wherein the data comprises inverter power feedbacks (Inv.$P_{FBK}$) and wherein the distributing of $Q_{COM}$ to the individual inverters is based on the inverter power feedbacks (Inv.$P_{FBK}$) by generating an inverter reactive power command (Inv[x].QCom[k]).

9. The method of claim 6, wherein the SiteQErr is calculated:
(a) based on a reactive power reference (SiteQrefGain) based on:

$$SiteQrefGain = -\text{sign}(PF_{ref})\sqrt{\frac{1}{PF_{ref}^2} - 1}$$

(b) and based on a gain $K_{IQ}$ based on:

SiteQErr=(SiteQrefGain[k]*$P_{fb}$−$Q_{fb}$)$K_{IQ}$.

10. The method of claim 6, wherein the SiteVErr is calculated based on a gain $K_{IV}$ based on:

SiteVErr=(SiteVRef−$V_{fbk}$)$K_{IV}$.

11. The method of claim 6 comprising choosing the power factor control mode and wherein when $Q_{FBK}$ is within Q_UL and Q_LL, the source of error is calculated as SiteVErr, or wherein when $Q_{FBK}$ exceeds Q_UL or Q_LL, the source of the error is calculated as the gain-multiplied reactive power threshold error which is a reactive power threshold error multiplied by gain $K_{IQ}$.

12. The method of claim 6 comprising choosing the voltage control mode and wherein when $V_{FBK}$ is within V_UL and V_LL, the source of the error is calculated as SiteQErr, or wherein when $V_{FBK}$ exceeds V_UL and V_LL, the source of the error is calculated as the gain-multiplied voltage threshold error which is a voltage threshold error multiplied by gain $K_{IV}$.

13. The method of claim 6, wherein loop delay compensation is implemented by comparing a present inverter reactive power feedback signal with a corresponding reactive power reference which was computed LoopDelay seconds previously to determine if an inverter is saturated and replacing current site reactive power reference gain used to generate the site reactive power error with site reactive power reference gain generated LoopDelay seconds previously.

14. The method of claim 6, further comprising performing loop delay compensation, wherein (a) SiteQRefGain[k] is offset by a LoopDelay term D such that SiteQRefGain[k] is replaced by SiteQRefGain[k−D], or wherein (b) Inv[x].QCom[k] is offset by a LoopDelay term D such that Inv[x].QCom[k] is replaced by Inv[x].QCom[k−D].

15. The method of claim 6 comprising integrator anti-windup based on either an upper limit computed at least partly from the maximum feedback power, or windup enabled logic based on a number of saturated inverters.

16. The method of claim 6, wherein the choosing between a power factor control mode and a voltage control mode is performed using a linear switch block with fixed transition time to transition between the power factor control and voltage modes.

17. The method of claim 16, wherein the linear switch block is operably configured to transition an error in and out of threshold modes at a steady slew rate by incrementing a variable, switch, by a parameter, QSlewInc, while the threshold limit input is 1 and decrementing switch by QSlewInc while the threshold limit input is 0 such that output of the linear switch block is given by:

out=in1*switch+in0*(1−switch)

wherein switch is limited to between 0 and 1.

18. The method of claim 6, wherein the data includes a reactive power output (Inv[x].$Q_{FBK}$) and a new integrator value ($Q_{ERR}$) is calculated and a counter (NumQFree) increments by one for each inverter with Inv[x].$Q_{FBK}$ substantially equal to Inv[x].QCom[k], such that $Q_{ERR}$ continues to be incremented when an absolute value of the new integrator value is less than a previous integrator value, or NumQFree is greater than zero.

19. A system of reactive power control for a renewable energy site comprising:
one or more inverters; and
a reactive power controller in operable communication with at least one of the one or more inverters and operably configured to generate a site-wide reactive power command ($Q_{COM}$) by:
(1) providing data from a renewable energy site chosen from one or more of:
(a) reactive power feedback ($Q_{FBK}$);
(b) reactive power upper (Q_UL) and lower (Q_LL) limits;
(c) a voltage reference (SiteVRef);
(d) voltage feedback ($V_{FBK}$);
(e) voltage upper (V_UL) and lower (V_LL) limits;
(f) a power factor reference ($PF_{REF}$); and
(g) a power feedback ($P_{FBK}$); and
(2) calculating at least one source of error as:
(a) a reactive power error (SiteQErr) based in part on $Q_{FBK}$ and $P_{FBK}$;
(b) a gain-multiplied voltage threshold error based in part on $V_{FBK}$, V_UL, and V_LL;
(c) voltage error (SiteVErr) based in part on $V_{FBK}$ and Vref;
(d) a gain-multiplied reactive power threshold error based in part on $Q_{FBK}$, Q_UL, and Q_LL;
(3) selecting the source of error to be calculated based in part on choosing between a power factor control mode and a voltage control mode;
(4) inputting the error into an integrator to provide an error integral ($Q_{INT}$);
(5) calculating a reactive power compensation term ($Q_{COMP}$) based in part on $PF_{REF}$ and $P_{FBK}$; and
(6) adding $Q_{INT}$ to $Q_{COMP}$ to yield a site-wide reactive power command ($Q_{COM}$).

20. The system of claim 19, wherein the reactive power controller is operably configured to distribute the site-wide reactive power command ($Q_{COM}$) among one or more inverters which are enabled at the site.

21. The system of claim 20, wherein the data comprises inverter power feedbacks (Inv.$P_{FBK}$) and wherein the reactive power controller is operably configured to distribute $Q_{COM}$ among individual inverters based on the inverter power feedbacks (Inv.$P_{FBK}$) by generating an inverter reactive power command (Inv[x].QCom[k]).

22. A method for reactive power control for a renewable energy site that comprises one or more inverters, the method comprising:
  (a) determining a site-wide reactive power command comprised by a sum of a reactive power feedforward or compensation term and an integrator term; and
  (b) distributing the site-wide reactive power command among the one or more inverters;
  wherein the determining of the site-wide reactive power command involves choosing between a power factor control mode and a voltage control mode and is performed using a linear switch block with fixed transition time to transition between the power factor control mode and the voltage control mode; and further comprising integrator anti-windup based on either an upper limit computed at least partly from maximum feedback power, or windup enabled logic based on a number of saturated inverters.

23. The method of claim 22 further comprising: providing for LoopDelay compensation by: comparing a present inverter reactive power feedback signal with a corresponding reactive power reference which was computed LoopDelay seconds previously to determine if an inverter is saturated, and replacing current site reactive power reference gain used to generate site reactive power error with site reactive power reference gain generated LoopDelay seconds previously.

* * * * *